Aug. 12, 1969　　　　　I. L. JOY　　　　　3,461,284
HEAT DETECTING SYSTEM
Filed Sept. 5, 1967　　　　　　　　　　　4 Sheets-Sheet 1

INVENTOR
IVAN L. JOY
BY
Hibben, Noyes & Bicknell
ATTYS.

Aug. 12, 1969     I. L. JOY     3,461,284

HEAT DETECTING SYSTEM

Filed Sept. 5, 1967     4 Sheets-Sheet 3

INVENTOR
IVAN L. JOY
BY
Hibben, Noyes & Bicknell
ATTYS.

Aug. 12, 1969     I. L. JOY     3,461,284
HEAT DETECTING SYSTEM
Filed Sept. 5, 1967     4 Sheets-Sheet 4
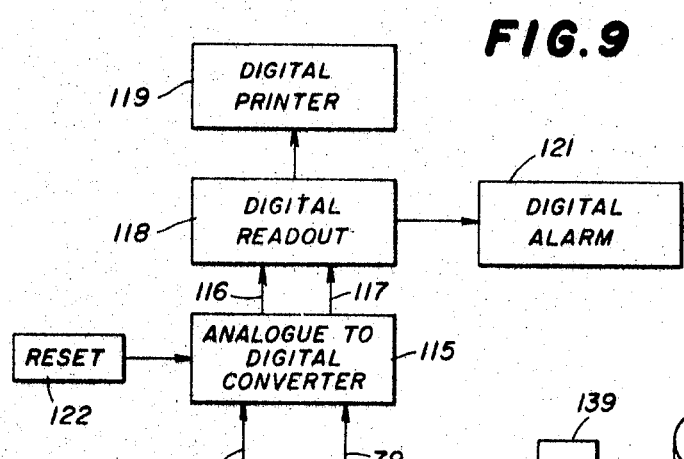
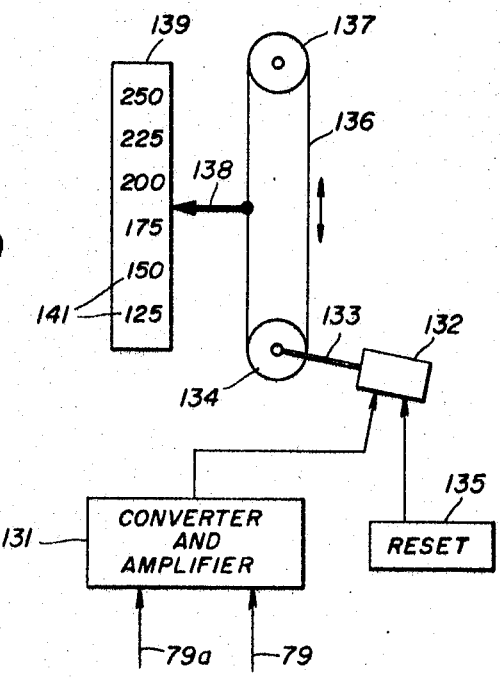
INVENTOR
IVAN L. JOY
ATTYS.

ent Office 3,461,284
Patented Aug. 12, 1969

3,461,284
HEAT DETECTING SYSTEM
Ivan L. Joy, 1616 W. 29th St., Topeka, Kans. 66611
Filed Sept. 5, 1967, Ser. No. 665,329
Int. Cl. B61l 3/06; B61k 9/06
U.S. Cl. 246—169
16 Claims

ABSTRACT OF THE DISCLOSURE

This disclosure deals with a system for detecting the amount of heat radiated by each of a series of moving objects and for giving an indication of the amount of such heat radiation or giving a signal when such heat radiation exceeds a predetermined value. The objects may be the wheel journals of a train and the system may be installed at a trackside location.

Numerous heat detecting systems have been developed in recent years, which are designed to detect excessively heated journals of moving trains. Such systems are important because failure to detect such a journal often leads to wreckage of a train. Most of the systems devised for this purpose include an electrical heat sensitive element, such as a thermistor, which changes its electrical characteristics with changes in the amount of heat focused on it. Often, a continuous record on tape is made of the temperatures of the journals, or an alarm may be sounded in response to an overly heated journal. Such prior art systems are disadvantageous primarily in that they are excessively complex and expensive.

In accordance with the present invention, a simplified and improved heat detecting system for detecting and indicating the temperature of passing objects such as journals is provided, including heat radiation responsive means continuously exposed to the radiation from passing objects and generating electrical signals representative of the amount of heat radiation received from the objects, auxiliary radiation means for modulating the electrical signals, and indicator means responsive to the modulated electrical signals for giving an indication representative of the temperature of the objects. Preferably, trip means is also provided, which generates a trip signal each time one of the objects passes the heat radiation responsive means. The trip signals are connected to the auxiliary radiation means such that the auxiliary radiation means is active only when the heat radiation responsive means is also receiving heat radiation from one of the objects, thereby making the electrical signals from passing objects more easily distinguishable from electrical signals due to other sources. The trip signals may also operate a counter in order to locate a hot journal.

Objects and advantages of the invention will become apparent from the following description taken in conjunction with the accompanying figures of the drawings, in which:

FIGS. 9 to 10 are diagramatic views of alternate forms of an indicator of the system.

Figure 1:
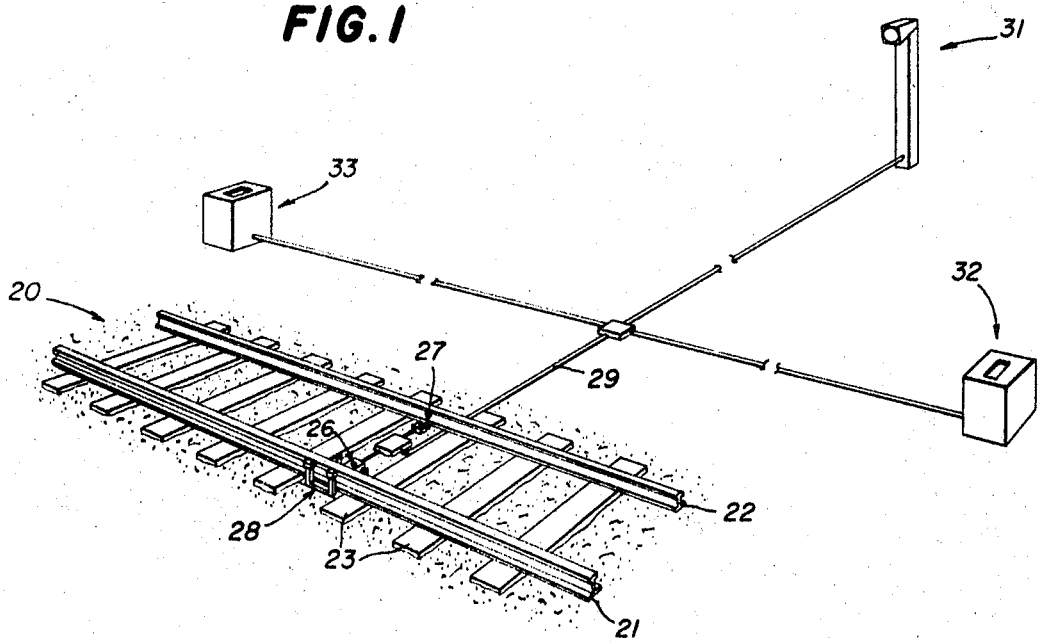
FIG. 1 is a perspective view of a heat detecting system embodying the invention.
Figure 2:
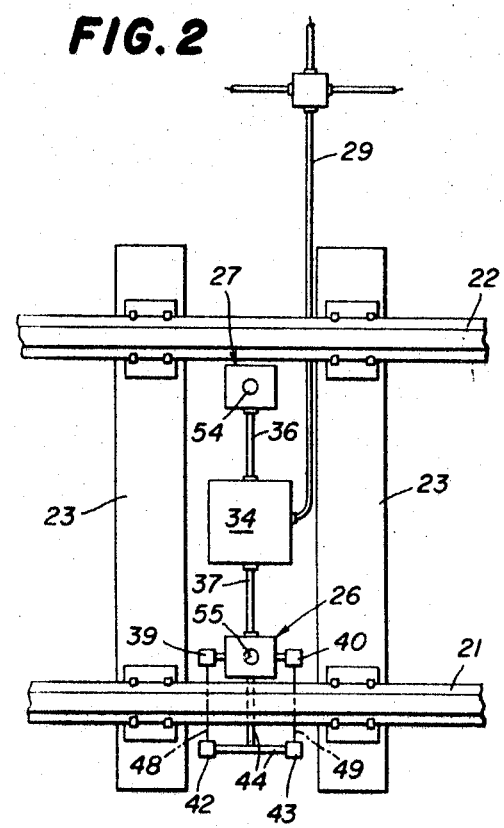
FIG. 2 is a top elevational view of the portion of the detecting system.
Figure 3:
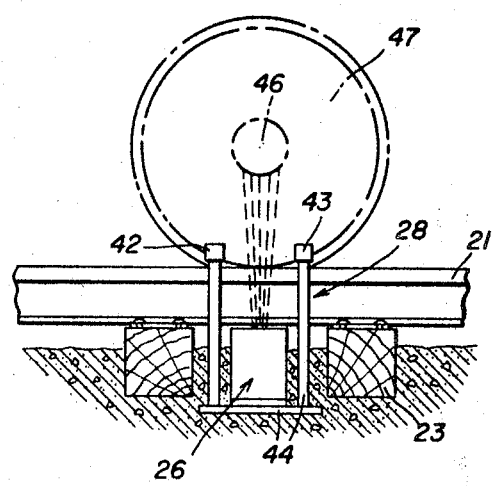
FIG. 3 is a side elevational view of the portion of the system shown in FIG. 2.

FIGS. 1 through 3 show a heat detecting system embodying the invention, installed at a track side location and adapted to detect the temperature of the journals of passing trains and give a signal when the temperature of a journal exceeds a predetermined safe value. With reference to FIG. 1, the reference numeral 20 indicates a section of railroad track including rails 21 and 22 which are supported by wooden ties 23. The detecting system includes two heat detector units 26 and 27 mounted between the rails 21 and 22 and between a pair of the ties 23, and a wheel trip 28 mounted adjacent the units 26 and 27 and having portions on opposite sides of the rail 21. The two detector units 26 and 27 and the wheel trip 28 are electrically connected by conductors in a cable 29 to an indicator 31 and two counters 32 and 33. The indicator 31 is preferably located adjacent the two detector units 26 and 27 but laterally displaced a short distance from the track 20, and the two counters 32 and 33 are preferably mounted at locations down the track in opposite directions from the two detector units 26 and 27.

During the operation of the system, a train moving along the track 20 passes the two detector units 26 and 27 which sense the heat of the two journals at the opposite ends of each axle. When a journal has a temperature higher than a predetermined safe value, one of the detector units generates a signal which is passed to the indicator 31. At the same time, activating signals are passed to and start up the two counters 32 and 33, and thereafter each axle passing the detectors 26 and 27 generates a signal which is passed to the counters 32 and 33 and counted. Subsequently, a trainman riding in the caboose at the rear end of a train will receive the signal from the indicator 31 when the caboose passes the indicator 31, and he may then signal for the train to stop. The trainman can then walk to the adjacent one of the two counters 32 and 33, depending upon the direction of movement of the train, and look at the reading of the counter to determine the number of axles which passed the detector units after the hot journal passed the units. The trainman may then personally inspect the hot journal by counting from the end of the train forwardly a number of axles corresponding to the reading of the counter and make a personal determination of whether the train should be stopped for repairs or whether the train may cautiously continue. The system may also include means, as will be described hereinafter, for manually resetting the system by the trainman after taking a reading of a counter. When a train does not have a hot journal present and it does not stop, an automatic reset mechanism is preferably provided for resetting the system in preparation for a subsequent train.

With reference to FIGS. 2 and 3, the two detecting units 26 and 27 are preferably mounted adjacent the inner sides of the rails 21 and 22, respectively. A box 34 for electrical components may be located between the two units 26 and 27, and the two units 26 and 27 and the box 34 are preferably secured together as by braces or electrical conduits 36 and 37. The two units 26 and 27 and the box 34 are preferably buried in the soil between the ties such that they are held in lateral alignment relative to the rails 21 and 22.

The wheel trip 28 includes two lights 39 and 40 located on one side of the rail 21 and two photoelectric cells 42 and 43 located on the opposite side of the rail 21, the photoelectric cells and the lights preferably being secured, as by straps or brackets 44, to the housing for the unit 26 in order to hold the wheel trip 28 in lateral alignment with the two units 26 and 27.

As previously stated, the two detector units 26 and 27 are aligned laterally of the rails 21 and 22, and the wheel trip 28 is located symmetrically with respect to the center line or viewing axis of the two detecting units 26 and 27. FIG. 3 shows in dashed lines an axle 46 and a wheel 47 associated therewith. As shown into FIG. 3, the viewing axes of the two units 26 and 27 is vertical, and the two detecting units 26 and 27 are focused on the respective opposite ends of the axle 46 as it passes. It has been found that the temperature of each end portion of an axle gives an accurate indication of the temperature of the associated journal.

With reference to FIGS. 2 and 3, the photoelectric cell 42 receives radiation from the light 39 along a light path 48, and, similarly, the photoelectric cell 43 receives radiation along a light path 49 from the light 40. The distances, lengthwise of the track, between the photoelectric cells 42 and 43 and the associated lights 39 and 40, and their vertical distance above the head of the rail 21 are such that both light paths 48 and 49 are simultaneously broken by a wheel 47 when the axle 46 is directly over the units 26 and 27. The light paths 48 and 49 are simultaneously broken and the wheel trip 28 starts to produce a trip signal after the axle enters the field of view of the units 26 and 27, and the wheel 47 passes one of the two light paths and thus terminates the trip signal before the axle leaves the field of view of the units 26 and 27. The units 26 and 27 preferably view approximately a three inch long area on the underside of each end of the axle 46 during the period of the trip signal.

Figure 4:
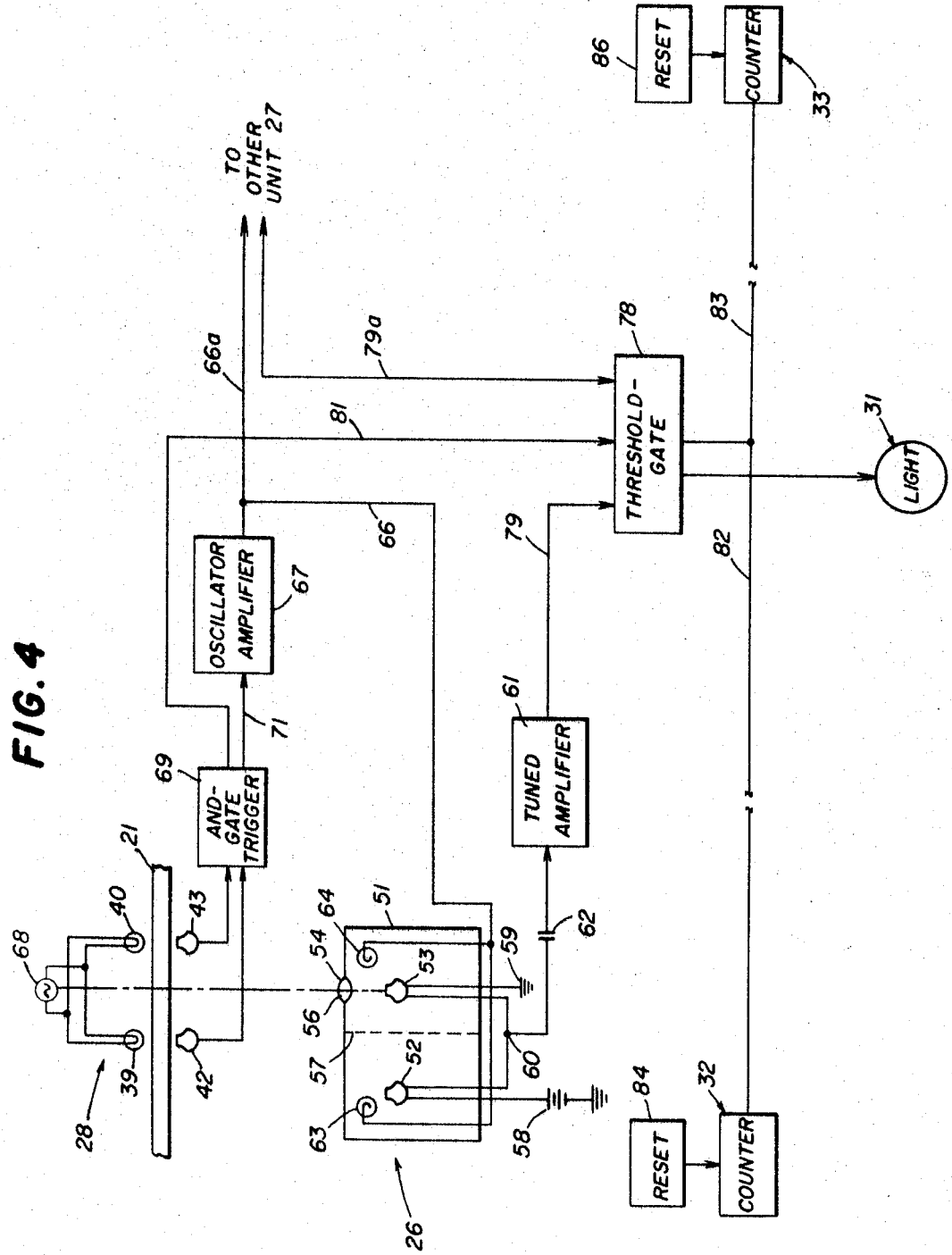
FIG. 4 is a schematic electrical diagram of the system.

FIG. 4 illustrates a portion of the system, including the detector unit 26 and the wheel trip 28. The detector unit 27 is identical with the unit 26 and therefore is not illustrated in detail. The unit 26 comprises a housing 51 and two infrared sensitive electrical elements 52 and 53 within the housing, having a characteristic which varies with the amount of heat received by it. These two elements 52 and 53 may, for example, be lead selenide cells or lead sulfide cells, the resistances of which are proportional to their temperatures. A viewing aperture 54 is formed in the top wall of the housing 51 and an infrared lens 56 is mounted adjacent the aperture 54 such that infrared radiation passing through the aperture 54 is focused on the element 53. The other element 52 is mounted in the housing 51 such that it does not receive infrared radiation through the aperture 54, and a shield 57 may be mounted between the element 52 and the aperture 54 for this purpose.

The two elements 52 and 53 are electrically connected in series between the positive potential terminal of a DC source 58 and a ground connection 59. An output signal is taken at a terminal 60 between the two elements 52 and 53 and passed to a high gain amplifier 61 through a capacitor 62.

Also mounted within the housing 51 is an auxiliary radiation means for modulating the output signal. The auxiliary radiation means comprises two lamps 63 and 64 which are respectively positioned adjacent the elements 52 and 53. The lamps are similarly located relative to their associated elements so that the element 52 receives the same amount of radiation from the lamp 63 as the element 53 receives from the lamp 64 when the two lamps 63 and 64 are energized. The element 53 also simultaneously receives radiation through the viewing aperture 54 as previously explained.

Instead of the two lamps 63 and 64, the modulating means could comprise a single lamp positioned relative to the two elements 52 and 53 such that the two elements receive identical amounts of radiation from the single lamp.

The two lamps 63 and 64 are connected in parallel to a conductor 66 to receive enerfiizing altenrating current from an oscillator-amplifier circuit 67 which produces sufficient alternating current signal at, for example, 5000 c.p.s. to simultaneously energize both lamps 63 and 64. The oscillator-amplifier 67 is turned on by the wheel trip 28 which includes the two lamps 39 and 40 and the two photocells 42 and 43, previously described. While a train is moving past the system, the two lamps 39 and 40 of the wheel trip are continuously energized by an oscillator 68 which produces, for example, a 400 c.p.s. sine wave. The two photocells 42 and 43 are connected to the input of an "and-gate" trigger circuit 69 which produces the trip signal previously referred to on a conductor 71 whenever the light paths to the photocells 42 and 43 are simultaneously broken. The conductor 71 is connected to a bias electrode of the oscillator-amplifier circuit 67 such that the oscillator-amplifier is biased on only in the presence of a trip signal.

Thus, each time a wheel passes the wheel trip 28, both light paths to the photocells 42 and 43 are simultaneously broken, the trigger circuit 69 produces a trip-signal, the oscillator-amplifier 67 is biased on, and the two lamps 63 and 64 are momentarily energized. The two lamps 63 and 64 are types which can be turned on and off very quickly. They are, for example, incandescent lamps having filaments of very low mass, which are capable of being heated and then cooling off at the frequency of the oscillator-amplifier 67. The lamps 63 and 64 are energized and deenergized once for each half-cycle of a sine wave, and therefore they will be turned on and off 10,000 times per second when the frequency of the oscillator-amplifier 67 is 5000 c.p.s.

Figure 6:
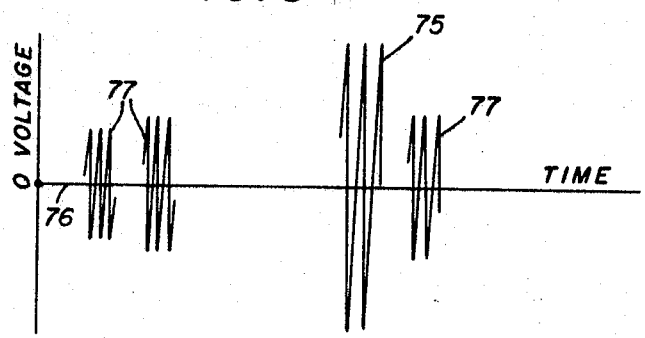
FIG. 6 shows wave forms illustrating the operation of the system.

When a train is passing the system but an axle is not directly over the unit 26, the wheel trip is not actuated and the two lamps 63 and 64 are not energized. The element 53 receives radiation from ambient bodies such as the underside of a box car and the element 52 is shielded from such radiation. Direct current from the direct current source 58 flows through the two elements 52 and 53 which act as variable resistors, and the elements 52 and 53 are matched so that the voltage drops across them are equal. A variable resistor (not shown) may be connected in series with one of two elements 52 and 53 if necessary to match them. Due to the resistance balance, the DC voltage at the terminal 60 will normally be one-half that of the DC source 58. The capacitor 62 blocks the DC from the amplifier 61 and consequently the signal input to the amplifier 61 is normally zero volts as indicated by the portion 76 of the waveform in FIG. 6.

An axle moving past the unit 26 causes the resistance of the element 53 to drop somewhat because the ends of an axle are heated by the journals and are therefore normally hotter than the underside of a car, and the voltage at the terminal 60 also drops a corresponding amount. The result is a change in the voltage at the terminal 60 having an amplitude which is proportional to the temperature of the end of the axle being viewed by the unit 26.

The foregoing arrangement of the two elements 52 and 53 in a balanced circuit is also advantageous in that variations in the ambient temperature do not modify the operating characteristics of the circuit in any way.

At the same time that the axle 46 is over the unit 26, one of the wheels 47 associated with the axle actuates the wheel trip 28 and thereby energizes the lamps 63 and 64. While the two lamps 63 and 64 are energized, the two elements 52 and 53 receive equal amounts of radiation from the lamps 63 and 64, respectively, and such radiation is in phase because the lamps are connected in parallel. Consequently, the resistances of the two elements 52 and 53 vary in phase due to the lamps, the resistance of the element 53 simultaneously varying due to the heat of the axle.

Thus, the voltage at the terminal 60 includes a varying DC component which is representative of the temperatures of the objects being viewed by the element 53 and also includes, when an axle is over the unit 26, an AC component which is due to the modulating lamps 63 and 64. If the resistances of the two elements 52 and 53 were equal, the AC component at the terminal 60 would be zero because the resistances of the two elements 52 and 53 vary in amplitude and, consequently, the percentages of the overall voltage drop on both sides of the terminal 60 would always be equal or balanced. However, when the resistance of the element 53 drops, as when an axle is being viewed, the balanced resistance condition no longer exists and the AC component at the terminal 60 has a finite magnitude. This finite AC component has an amplitude which is proportional to the extent of the resistance unbalance which in turn is proportional to the temperature of the end of the axle being viewed by the element 53, and the AC component passes through the capacitor 62 and is amplified by the amplifier 61. The DC component is of course blocked by the capacitor 62. It is preferred that the amplifier be tuned to the frequency of the AC component, but this is not necessary.

With reference again to FIG. 6, the numeral 76 indicates the signal input to the amplifier 61 when an axle is not over the unit 26, the numeral 77 indicates AC signals due to journals running at safe operating temperatures, and the numeral 75 indicates an AC signal due to a journal having an excessively high temperature.

As previously mentioned, the other detector unit 27 is identical with the detector unit 26, and, therefore, the construction and operation of the unit 27 is not described in detail. The unit 27 views the opposite end of the axle being viewed by the unit 26, and consequently the two units 26 and 27 simultaneously take readings of the opposite ends of every axle as they pass the units. The wheel trip 8 is connected to energize the modulating lamps 63 and 64 of both units 26 and 27, a conductor 66a connecting the output of the oscillator-amplifier 67 to the lamps of the unit 27 and the conductor 66 leading to the lamps of the unit 26. The electrical signal from the amplifier 61 of the unit 26 is connected by a conductor 79 to the input of a threshold-gate circuit 78, and the output of the amplifier in the unit 27 which corresponds to the amplifier 61 of the unit 26 is connected by another conductor 79a to another input to the threshold-gate circuit 78. The threshold-gate 78, which has a conventional construction, produces a trip signal when the amplitude of a signal on either of the conductors 79 or 79a exceeds a predetermined threshold level. The threshold level is adjusted such that it corresponds to the upper limit of the safe operating temperature range of a journal. Thus, a signal on one of the conductors 79 and 79a exceeding the threshold value indicates that a journal is excessively hot. The trip signal generated in the threshold-gate 78 is connected to energize the indicator 31 which is laterally offset from the track 20 a short distance and is preferably elevated above ground level by a post, as shown in FIG. 1, so that it may be easily viewed by a trainman in the caboose of a passing train. The indicator 31 is preferably a white light and, when energized, constitutes a signal to the trainman that a journal on the train is excessively hot and that he should consider stopping the train to inspect the journal. Of course, if the indicator 31 is off, the trainman is informed that all of the journals on the train are running at safe operating temperatures.

The and-gate trigger circuit 69 is also connected by a conductor 81 to another input to the threshold-gate 78, and at the same time that a signal on one of the two conductors 79 and 79a energizes the indicator 31, the gate is opened and the trigger signals appearing on the conductor 81 are passed through the gate to a pair of conductors 82 and 83 which lead to the two counters 32 and 33, respectively. Thereafter, each trigger signal generated by the trigger circuit 69 is passed through the gate 78 and is counted by both counters 32 and 33 until the last car on the train passes the wheel trip 28. Consequently, the readings on the two counters 32 and 33 indicate the number of wheels which have passed the wheel trip 28 after an excessively hot journal has been detected by one of the two units 26 and 27. The two counters 32 and 33 preferably include reset mechanisms 84 and 86, respectively, which may be manually actuated by a trainman after he takes a reading of one of the two counters 32 and 33 to reset the two counters and to turn off the indicator 31. The two mechanisms preferably also include timers which automatically reset the two counters 32 and 33 and turn off the indicator 31 approximately 15 minutes, for example, after the indicator 31 has been turned on in the event the trainman decides not to stop the train and actuate the manual reset.

The system may be powered in any manner desired. For example, the system may be energized by a DC source including a 24 volt battery and a regulator which regulates the output voltage of the battery to 20 volts DC. The DC source 58 represents schematically the combination of such a battery and regulator. In such a power supply, the AC source 68 would include a chopper connected to the output of the regulator. The system including the wheel trip may be left on continuously or a conventional trip mechanism (not shown) may be provided to automatically turn on the system when a train approaches from either direction and then turn the system off a predetermined time after the train has passed.

Figure 5:
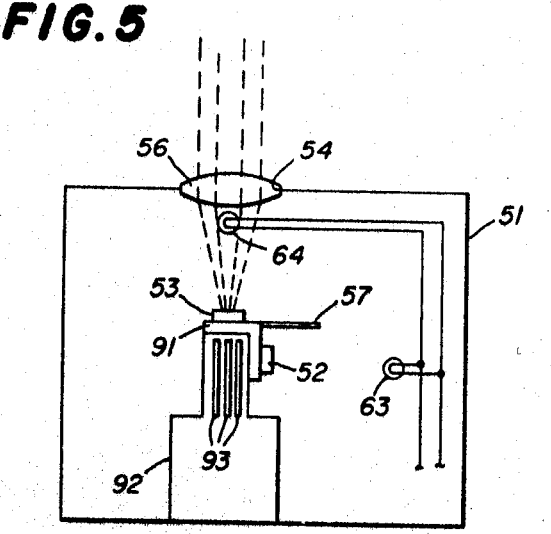
FIG. 5 is a diagrammatic view of a portion of the system.

FIG. 5 illustrates in greater detail the construction of the housing 51 for the unit 26 and the mounting of the components therein. This arrangement is of course identical with that for the unit 27. The viewing aperture 54 is formed on the top side of the housing 51 and the lens 56 is secured within the viewing aperture 54. A protective guard may be provided to protect the lens 56 and to keep dirt and stones from settling on top of the lens 56. The lamp 64 is relatively small as compared with the size of the lens 56 and is preferably mounted adjacent to and on the optical axis of the lens 56 where it presents little interference with the passage of infrared radiation through the lens 56. The elements 52 and 53 are preferably mounted on a base 91 made of a heat conductive material such as copper, thus insuring that the two elements 52 and 53 will be at substantially the same temperature. As shown in FIG. 5, the copper base 91 is angle-shaped and is positioned with one arm substantially normal to the optical axis of the lens 56, the element 53 being mounted on the top side of this arm. The element 52 is mounted on the other arm of the base 91 away from the element 53, and the shield 57, when one is provided, is located between the two elements 52 and 53. The modulating lamp 63 is mounted within the housing 51 adjacent the element 52 and away from the other element 53, so that the element 52 receives radiation only from the lamp 63 when this lamp is energized.

The base 91 is fastened to a stand 92 which preferably includes a cooling device such as thermoelectric modules 93, so that the base 91 and the two elements 52 and 53 may be maintained at a relatively low, constant temperature. A preferred temperature range is from zero to ten degrees below zero Fahrenheit. The thermoelectric modules are connected in the power circuit along with a thermostate (not shown) to automatically maintain the desired low temperature.

Figure 7:
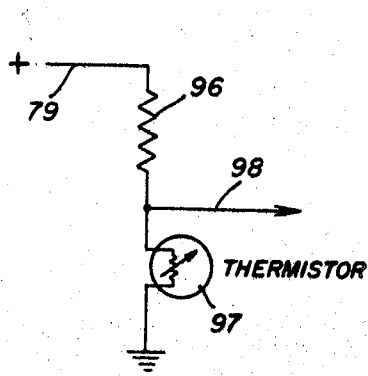
FIG. 7 is a schematic electrical diagram of a portion of the system.

FIG. 7 illustrates an automatic temperature compensating circuit which may be provided at the input to the threshold-gate circuit 78 (FIG. 4). The compensating circuit includes a resistor 96 and a temperature sensitive thermistor 97 which are connected in series between the conductor 79 and ground. A conductor 98 connected between the resistor 96 and the thermistor 97 leads to an input of the threshold-gate circuit 78. During the operation of the circuit shown in FIG. 7, the voltage on the conductor 98 with respect to ground depends upon the resistance of the thermistor 97, and any increase in ambient temperature tending to raise the value of the voltage on the conductor 79 will also cause a drop in the resistance of the thermistor 97, thereby balancing out any variations due to ambient temperature conditions. A second circuit identical with the circuit shown in FIG. 7 is also preferably connected between the conductor 79a and the threshold-gate circuit 78.

Figure 8:
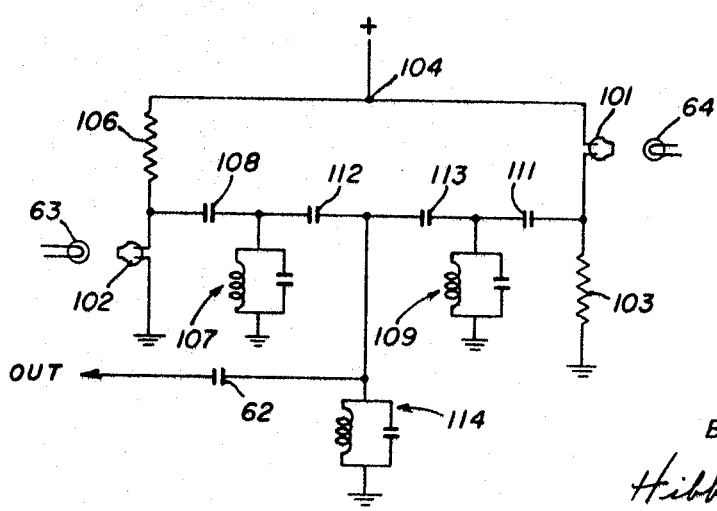
FIG. 8 is a schematic electrical diagram of an alternate form of a portion of the circuit.

The circuit shown in FIG. 8 may be used in place of the portion of each detector unit, including the infrared sensitive elements when an improved waveform is desired. The circuit shown in FIG. 8 includes two infrared sensitive elements 101 and 102, element 101 being connected in series with a resistor 103 between a positive potential terminal 104 and a ground connection, and the element 102 being connected in series with a resistor 106 between the positive potential terminal 104 and another ground connection. Thus, the compoents 101, 102, 103 and 106 form the four arms of a bridge network between the positive potential 104 and the ground connection. Four capacitors 108, 111, 112 and 113 are connected in series between connections of the arms. A tuned circuit 107 is connected from ground to a junction between the capacitors 108 and 112; a similar tuned circuit 109 is connected from ground to a junction between capacitors 111 and 113; and a third tuned circuit 114 is connected from ground to a junction between the two capacitors 112 and 113. The signal output from this circuit is taken above the tuned circuit 114 and leads to the capacitor 62. As in the detecting unit shown in FIG. 4, the element 101 is exposed to infrared radiation from the passing objects and to light from the lamp 64, and the element 102 receives light only from the lamp 63.

When using the detecting circuit shown in FIG. 4, the output signal to the amplifier 61 is not always a true sine wave, and this is due to the fact that the infrared elements 52 and 53 may be heated up more rapidly than they are able to cool off. For each on-off cycle of the two lamps 63 and 64, the resistance of the elements 52 and 53 drops rapidly and then increases at a slower rate, resulting in a somewhat distorted sine wave. This problem is substantially eliminated when using the circuit shown in FIG. 8 since the tuned circuits 107, 109 and 114 produce a substantially perfect sine wave signal. Variations in the resistance of the element 102 sets up oscillations in the circuit 107, and variations in the resistance of the element 101 sets up oscillations in the circuit 109. These oscillations normally cancel each other out, but when a resistance unbalance occurs, an AC component is present which sets up oscillations in the circuit 114, and these latter oscillations are fed to the amplifier 61. The tuned circuits 107, 109 and 114 should be tuned to 10,000 c.p.s. when the oscillator-amplifier 67 energizing the lamps 63 and 64 is operating at 5000 c.p.s.

FIGS. 9 and 10 illustrate alternate indicators which may be used in place of the light described with regard to the indicator 31 of FIGS. 1 to 4. In FIG. 9, the analogue signals on the conductors 79 and 19a are fed to an analogue to digital converter circuit 115 which produces two signals in digital form on conductors 116 and 117. These two digital signals are fed to a digital readout circuit 118 which actuates a digital printer 119 to make a permanent record in digital form of the signals. The digital readout circuit may also be connected to operate an alarm circuit 121 when the value of one of the input signals exceeds a predetermined threshold, and a reset circuit 122 may also be provided to reset the indicator system after a record has been made of all of the journals on a train. The indicator shown in FIG. 9 is preferably located at a central monitoring station which receives signals from a number of such systems. The conductor 81 shown in FIG. 4 would not be needed when using the indicator shown in FIG. 9.

The indicator shown in FIG. 10 includes a converter-amplifier circuit 131, which receives input signals from the two conductors 79 and 79a, and a motor 132 connected to be powered by the circuit 131. The converter-amplifier circuit 131 converts the incoming signals on the conductors 79 and 79a to a form which is capable of powering the electric motor 132. The motor 132 may have any conventional construction and, of course, the construction of the converter and amplifier circuit 131 depends upon the type of motor 132 employed. For example, if the motor 132 is a DC motor, the converter-amplifier 131 would convert the incoming signals to direct current. The output drive shaft 133 of the motor 132 is connected to a drive wheel 134 for an endless belt 136, the other end of the endless belt 136 being trained about an idler wheel 137. A pointer 138 is connected to a section of the belt 136 between the two wheels 134 and 137, and the end of the pointer 138 is located adjacent a relatively large member 139 which has numbers 141 marked thereon. The numbers 141 cover the range of temperatures expected for the journals of a train. In the present instance, the numbers 125, 150, 175, 200, 225 and 250 are shown on the member 139. The indicator shown in FIG. 10 is preferably located in a manner similar to the light previously described, so that it may be veiwed by a trainman in a caboose.

When a train passes a system including an indicator of the type shown in FIG. 10, signals of different amplitudes are fed on the conductors 79 and 79a to the converter-amplifier circuit 131 where they are converted to a form suitable to drive the motor 132 as previously explained. Each time a signal appears on one of the two conductors 79 and 79a, which is larger in amliptude than any of the preceding signals for this particular train, the motor 132 is energized to shift the pointer 138 upwardly to the number 141 which represents the temperature of the journal that was responsible for that signal. For example, if the pointer 138 is adjacent the number 190, the pointer 138 will remain at this location until a journal passes the detector units having a temperature greater than 190. If such a journal has a temperature of, for example, 225 degrees, the signal produced as a result of such a journal energizes the motor 132 to turn the belt 136 and shift the pointer 138 upwardly to the number 225 where it will remain unless a still hotter journal passes the units. Then, when a trainman in the caboose of the train passes the member 139, the trainman may read the number adjacent the pointer 138 and thereby learn the temperature of the hottest journal on the train. If the temperature indicated by the pointer 138 were excessively high, the trainman would stop the train and locate the excessively heated journal to make a personal determination of whether or not the train could safely continue. If desired, a counter similar to the counters 32 and 33 in an arrangement similar to that shown in FIG. 4 may be provided to assist the trainman in locating the excessively heated journal. An automatic reset 135 is preferably provided to reset the indicator to its lowest reading a predetermined time, such as fifteen minutes after the train has passed.

From the foregoing, it will be apparent that a relatively simple, inexpensive and reliable heat detecting system has been provided. The infrared sensitive elements detect the temperatures of all of the journals on a train and the arrangement of the elements in a balanced circuit and in combination with the modulating lamps insures that consistent and reliable temperature readings may be obtained. Since the electrical heat signals are modulated, AC circuits may be employed, which is advantageous in that they are more stable and give more dependable readings than DC circuits. The construction of the wheel trip including the photocells and the lights is also advantageous since there are no parts capable of wearing out due to repeated contact by the wheel of a train, and the light paths of the wheel trip may be adjusted to obtain exactly the length of trip signal desired. The portion of the system including the indicator light 31 and the counters 32 and 33, in the preferred form of the invention, is advantageous since they are simply constructed and reliable in operation, and a great deal of skill is not required to interpret the results. A principal advantage of the system disclosed herein is the fact that it may be inexpensively manufactured, installed, and maintained. This is very important in a hot journal detecting system because a railroad may include thousands of miles of track and it is desirable to have a system of the type disclosed herein located approximately every 15 miles. Consequently a very large number of such systems is required if proctection against journal burnout is to be obtained over the entire line, and the cost and reliability of a detecting system are very important considerations.

I claim:

1. A system for detecting the temperatures of a series of passing objects, comprising an infrared sensitive element continuously exposed to the heat of said passing objects, circuit means including said element for developing an output signal representative of the temperatures of said objects, modulation means positioned adjacent said element for emitting regularly varying auxiliary radiation, said element receiving said auxiliary radiation and said output signal being modulated thereby, and indicator means connected to receive said modulate output signal and provide an indication of the temperatures of said objects.

2. A system as in claim 1, and further including trip means responsive to said passing objects and connected to energize said modulation means only when said element is receiving infrared energy from one of said objects.

3. A system as in claim 1, wherein said circuit means further includes a second infrared sensitive element connected in a balanced circuit with said first mentioned element, and means for shielding said second element from infrared energy from said objects but permitting said auxiliary radiation to reach said second element.

4. A heat detecting system for detecting the temperatures of a series of passing objects, comprising infrared circuit means including an infrared sensitive element having an electrical characteristic that varies with variations in the amount of infrared radiation received by it from said objects, said circuit means further including balancing means connected to said element for normally balancing said electrical characteristic and producing an output signal between said element and said balancing means having a substantially constant predetermined value, means for focusing infrared radiation from said passing objects on said element, such radiation from a relatively hot object changing said electrical characteristic of said element and thereby unbalancing said circuit means and causing said output signal to vary from said predetermined value by an amount that is proportional to the temperature of said relatively hot object, auxiliary radiation means positioned adjacent said element for producing regularly varying auxiliary radiation, said auxiliary radiation also being received by said element and changing said electrical characteristic, said output signal thus also regularly varying by an amount that is proportional to the unbalance due to said relatively hot object, and indicator means responsive to said regular variations of said output signal for giving an indication of the temperature of said relatively hot object.

5. A system as in claim 4, wherein said balancing means comprises a second infrared sensitive element having an electrical characteristic which is substantially identical with said characteristic of said first mentioned element, said two elements being connected in series between a potential source to form said balanced condition, and said output signal appearing between said two elements, said second element also being positioned to receive said auxiliary radiation from said auxiliary radiation means.

6. A system as in claim 4, wherein said electrical characteristic of said element comprises the electrical resistance of said element.

7. A system as in claim 4, wherein said indicator means comprises a threshold circuit responsive to an output signal having an amplitude greater than a predetermined threshold level, and a light connected to be energized when said threshold circuit receives an output signal having an amplitude above said predetermined threshold level.

8. A system as in claim 5, and further including a base made of a heat conductive material, said two elements being mounted on said base, and cooling means for maintaining said base at a relatively low temperature.

9. A system as in claim 4, wherein said auxiliary radiation means is electrically energizable, and further including trip means responsive to said passing objects for energizing said auxiliary radiation means only when said element is receiving infrared radiation from one of said objects.

10. A system as in claim 9, wherein said trip means comprises two spaced apart photocells and two spaced apart lights, each of said lights being associated with one of said photocells and having a light path therebetween, said light paths crossing the line of movement of said objects, and circuit means responsive to a simultaneous breaking by one of said objects of both of said light paths for energizing said auxiliary radiation means.

11. A system as in claim 9, wherein said indicator means comprises a threshold circuit responsive to output signals having an amplitude above a predetermined threshold level, and at least one counter, said threshold circuit being connected to turn on said counter in response to an output signal having an amplitude greater than said predetermined threshold level, said trip means producing a trip signal in response to each object, said counter being connected to receive said trip signals through said threshold circuit so that said trip signals are received by said counters and counted after an output signal is received having an amplitude greater than said predetermined threshold level.

12. A system as in claim 5, and further including a tuned circuit connected to each of said elements, said two tuned cirucits also being connected together and to a third tuned circuit, whereby oscillations induced in said two tuned circuits are normally cancelled out when said circuit is balanced but oscillations are induced in said third tuned circuit when said infrared circuit means is unbalanced, said output signal being taken from said third tuned circuit.

13. A system as in claim 4, wherein said indicator means comprises an analogue-to-digital converter circuit connected to receive said output signals and convert said output signals to digital form, a digital readout circuit connected to the output of said converter circuit, and means connected to the output of said readout circuit for giving an indication of the amplitude of said output signal.

14. A system as in claim 4, wherein said indicator means comprises an electric motor connected to be powered by said output signals, a pointer connected to be driven by said motor, and means adjacent said pointer for indicating temperatures, said pointer being moved by said motor in response to said output signals to indicate the temperature of said objects.

15. A journal temperature detecting system comprising a pair of identical detector units adapted to be positioned between the rails of a track and view the opposite ends of each axle of a passing train, each of said units comprising an infrared sensitive element continuously exposed to the heat of passing objects including said axles, circuit means including said element for developing an output signal representative of the temperatures of said objects, modulation means positioned adjacent said element for emitting regularly varying auxiliary radiation, said element receiving said auxiliary radiation and said output signal being modulated thereby, and indicator means connected to receive the output signals from both of said units and provide an indication of the temperatures of the opposite ends of said axles.

16. A system as in claim 15, and further including wheel trip means responsive to passing wheels for energizing said modulation means only said elements are receiving infrared energy from said axles.

References Cited

UNITED STATES PATENTS 3,076,090  1/1963  Stapelfedlt
3,081,399  3/1963  Schwarz
3,244,875  4/1966  Crane et al.

ARTHUR L. La POINT, Primary Examiner

G. LIBMAN, Assistant Examiner

U.S. Cl. X.R.

73—355; 246—246; 250—83